US012671202B2

(12) United States Patent
Morello et al.

(10) Patent No.: US 12,671,202 B2
(45) Date of Patent: Jun. 30, 2026

(54) TERMINAL ASSEMBLY WITH TERMINAL INSPECTION PORT AND METHODS OF ASSEMBLING SAME

(71) Applicant: Aptiv Technologies AG, Schaffhausen (CH)

(72) Inventors: John Morello, Warren, OH (US); James M. Rainey, Warren, OH (US); Ryan Kirkpatrick, Cranberry, PA (US); Michael Barton, Ravenna, OH (US); Ryan Lewis, Niles, OH (US); Jeremy Kightlinger, Canfield, OH (US); Brian Goda, Hermitage, PA (US)

(73) Assignee: Aptiv Technologies AG, Schaffhausen (CH)

( * ) Notice: Subject to any disclaimer, the term of this patent is extended or adjusted under 35 U.S.C. 154(b) by 379 days.

(21) Appl. No.: 18/383,334

(22) Filed: Oct. 24, 2023

(65) Prior Publication Data

US 2025/0023279 A1 Jan. 16, 2025

Related U.S. Application Data

(60) Provisional application No. 63/526,220, filed on Jul. 12, 2023.

(51) Int. Cl.

*H01R 13/42* (2006.01)
*H01R 13/6585* (2011.01)
*H01R 43/20* (2006.01)

(52) U.S. Cl.

CPC ......... *H01R 13/42* (2013.01); *H01R 13/6585* (2013.01); *H01R 43/20* (2013.01)

(58) Field of Classification Search

CPC .... H01R 13/42; H01R 13/6585; H01R 43/20; H01R 9/0518; H01R 24/545; H01R 13/40; H01R 13/02

See application file for complete search history.

(56) References Cited

U.S. PATENT DOCUMENTS

| | | | | |
|---|---|---|---|---|
| 4,047,788 A * | 9/1977 | Forney, Jr. ........... | H01R 9/0518 439/585 |
| 4,096,627 A | 6/1978 | Forney et al. | |
| 4,655,534 A * | 4/1987 | Stursa .................. | H01R 24/545 439/582 |

(Continued)

FOREIGN PATENT DOCUMENTS

| | | | |
|---|---|---|---|
| CH | 2053705 * | 4/2009 | ............... H01R 9/05 |
| EP | 2053705 B1 | 5/2017 | |

OTHER PUBLICATIONS

"Extended European Search Report"; European Patent Office; mailed on Nov. 20, 2024; 11 Pages.

*Primary Examiner* — Truc T Nguyen
(74) *Attorney, Agent, or Firm* — Billion & Armitage

(57) ABSTRACT

A terminal assembly includes an insulative body having a terminal cavity formed within; a first terminal disposed within the terminal cavity; and a second terminal having an interface configured to connect with the first terminal within the terminal cavity. The insulative body defines an opening extending from an outer surface of the insulative body to the terminal cavity. The opening is sized, shaped, and arranged to provide visual access to verify a connection between the first and second terminals. Several methods of assembling such a terminal assembly are also disclosed.

16 Claims, 10 Drawing Sheets

(56) References Cited

U.S. PATENT DOCUMENTS

| | | | | |
|---|---|---|---|---|
| 4,932,898 | A * | 6/1990 | Goodman | H01R 9/0518 439/585 |
| 7,946,886 | B1 * | 5/2011 | Liu | H01R 4/36 439/582 |
| 8,647,128 | B2 * | 2/2014 | Sykes | H01R 24/44 439/63 |
| 9,762,001 | B2 * | 9/2017 | Morello | H01R 24/40 |
| 10,680,380 | B2 | 6/2020 | Penn et al. | |
| 10,770,840 | B1 | 9/2020 | Garver et al. | |
| 10,826,234 | B2 | 11/2020 | Penn et al. | |
| 10,886,668 | B1 | 1/2021 | Morello et al. | |
| 11,670,897 | B2 * | 6/2023 | Aboulkassem | H01R 13/112 439/607.01 |
| 2011/0230092 | A1 | 9/2011 | Maier et al. | |
| 2017/0222368 | A1 * | 8/2017 | Morello | G01R 31/69 |

* cited by examiner

TERMINAL ASSEMBLY WITH TERMINAL INSPECTION PORT AND METHODS OF ASSEMBLING SAME

CROSS-REFERENCE TO RELATED APPLICATION

This application claims benefit of priority to U.S. Provisional Application No. 63/526,220, titled "Right-angled Coaxial Terminal with Vision Portal", filed on Jul. 12, 2023, the entire disclosure of which is hereby incorporated by reference.

TECHNICAL FIELD OF THE INVENTION

This disclosure is directed to a terminal assembly, particularly to a terminal assembly having one or more terminal inspection ports which allows visual confirmation of proper seating and/or connection of electrical terminals within the connector.

BACKGROUND

Terminal assemblies may have a blind plug and socket connection between a male plug terminal and a female socket terminal within an insulator or connector housing. Blind plug and socket connections cause a risk of lower quality due to a partial or improper plugging of the male terminal within the female socket terminal which could lead to poor or intermittent performance of the connector. Some previous connector designs had a slot configured for viewing the interface between the male and female terminals along the terminal axis. However, this causes a long sight path which could obscure the view of the plug and socket connection and therefore render it difficult to clearly inspect the connection.

SUMMARY

In some aspects, the techniques described herein relate to a terminal assembly, including: an insulative body having a terminal cavity formed within; a first terminal disposed within the terminal cavity; and a second terminal having an interface configured to connect with the first terminal within the terminal cavity, wherein the insulative body defines a connection verification opening extending from an outer surface of the insulative body to the terminal cavity and wherein the connection verification opening is sized, shaped, and arranged to provide visual access to verify a connection between the first and second terminals.

In some aspects, the techniques described herein relate to a method of assembling a terminal assembly, including: forming a terminal cavity within an insulative body; inserting and securing a first terminal within the terminal cavity; mating a second terminal with the first terminal within the terminal cavity, wherein the insulative body defines a connection verification opening extending from an outer surface of the insulative body to the terminal cavity and wherein the connection verification opening is sized, shaped, and arranged to provide visual access to verify a connection between the first and second terminals; and inspecting the terminal assembly through the connection verification opening to verify that the first and second terminals are properly mated by viewing a tip of the second terminal in the connection verification opening.

In some aspects, the techniques described herein relate to a method of assembling a terminal assembly, including: forming a terminal cavity within an insulative body via an injection molding process using a core that is stabilized by at least two guide pins, wherein the at least two guide pins form a terminal viewing opening extending from an outer surface of the insulative body to the terminal cavity; inserting and securing a first terminal within the terminal cavity, wherein the first terminal has a first connection portion configured to connect with a second terminal and a second connection portion configured to connect with a third terminal; and inspecting the terminal assembly to verify that the second connection portion is visible through the terminal viewing opening.

BRIEF DESCRIPTION OF THE DRAWINGS

The present invention will now be described by way of example with reference to the accompanying drawings, in which.

DETAILED DESCRIPTION

Figure 1:
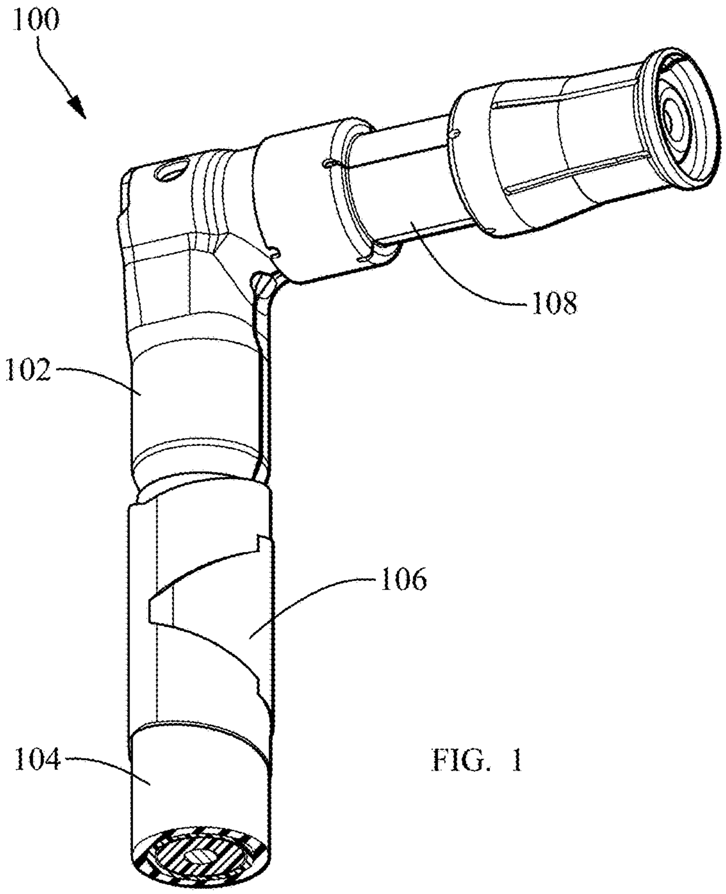
FIG. 1 illustrates an isometric view of a terminal assembly according to some embodiments.
Figure 2A:
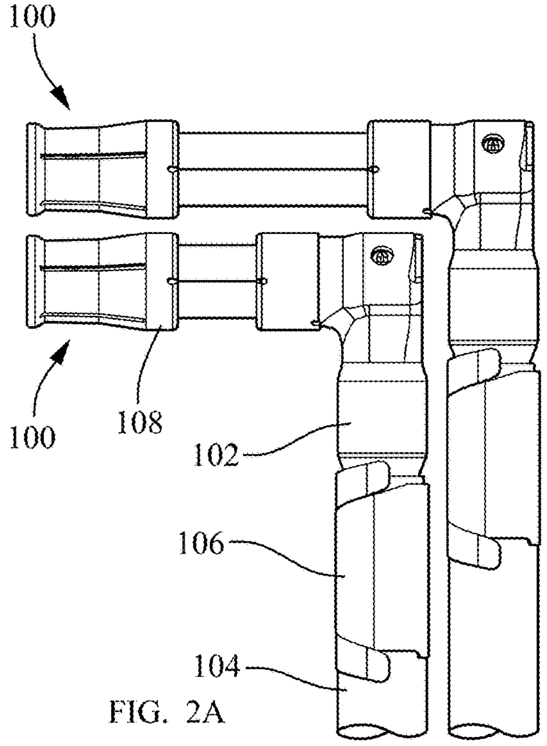
FIG. 2A illustrates side views of two variants of the terminal assembly of FIG. 1 according to some embodiments.
Figure 2B:
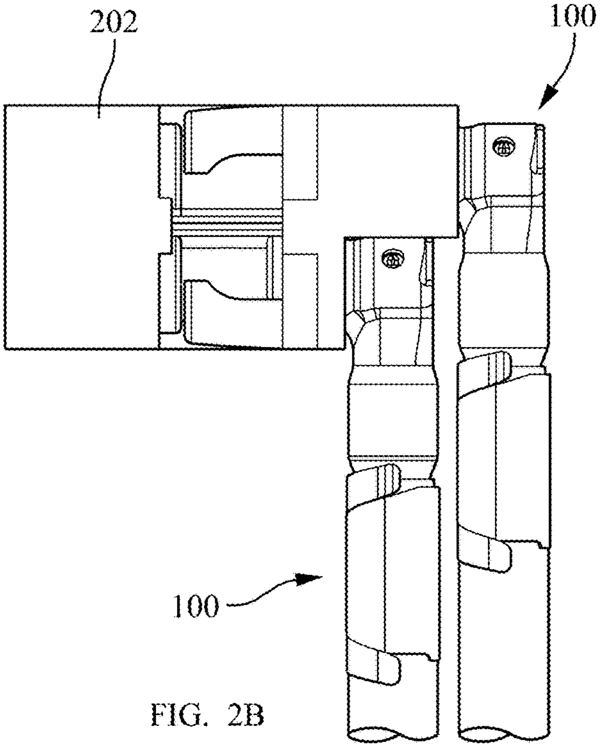
FIG. 2B illustrates a side view of the terminal assembly of FIG. 2A contained in a connector housing according to some embodiments.

FIGS. 1, 2A, and 2B illustrate non-limiting examples of embodiments of terminal assemblies 100. In these examples, the embodiments are right-angled coaxial terminal assemblies. These terminal assemblies 100 each have an attachment portion 102 that is attached to a coaxial cable 104 by a ferrule 106 crimped around the attachment portion 102. The terminal assemblies 100 also have a connection portion 108 that is generally arranged perpendicularly with the attachment portion 102 and that is configured to interconnect with a corresponding coaxial mating connector (now shown). As shown in FIGS. 2A and 2B, the length of the connection portion 108 may be varied to allow multiple terminal assemblies 100 to be accommodated in a single connector housing 202 as shown in FIG. 2B The attachment and connection portions 102, 108 are electrically interconnected and are connected to a shield conductor 704 (see FIG. 7) of the coaxial cable 104 to provide an electromagnetic shield for the center conductor terminal 702 attached to the central conductor 706 (see FIG. 7) of the coaxial cable 104 in the terminal assemblies 100. The housing 202 has several cavities that are configured to receive the terminal assemblies 100 and retaining features 204 configured to secure the terminal assemblies 100 within the cavities of the housing 202. The housing 202 may also be configured to receive the corresponding coaxial mating connectors and secure them to the terminal assemblies 100.

Figures 3A, 3B, 3C, 3D:
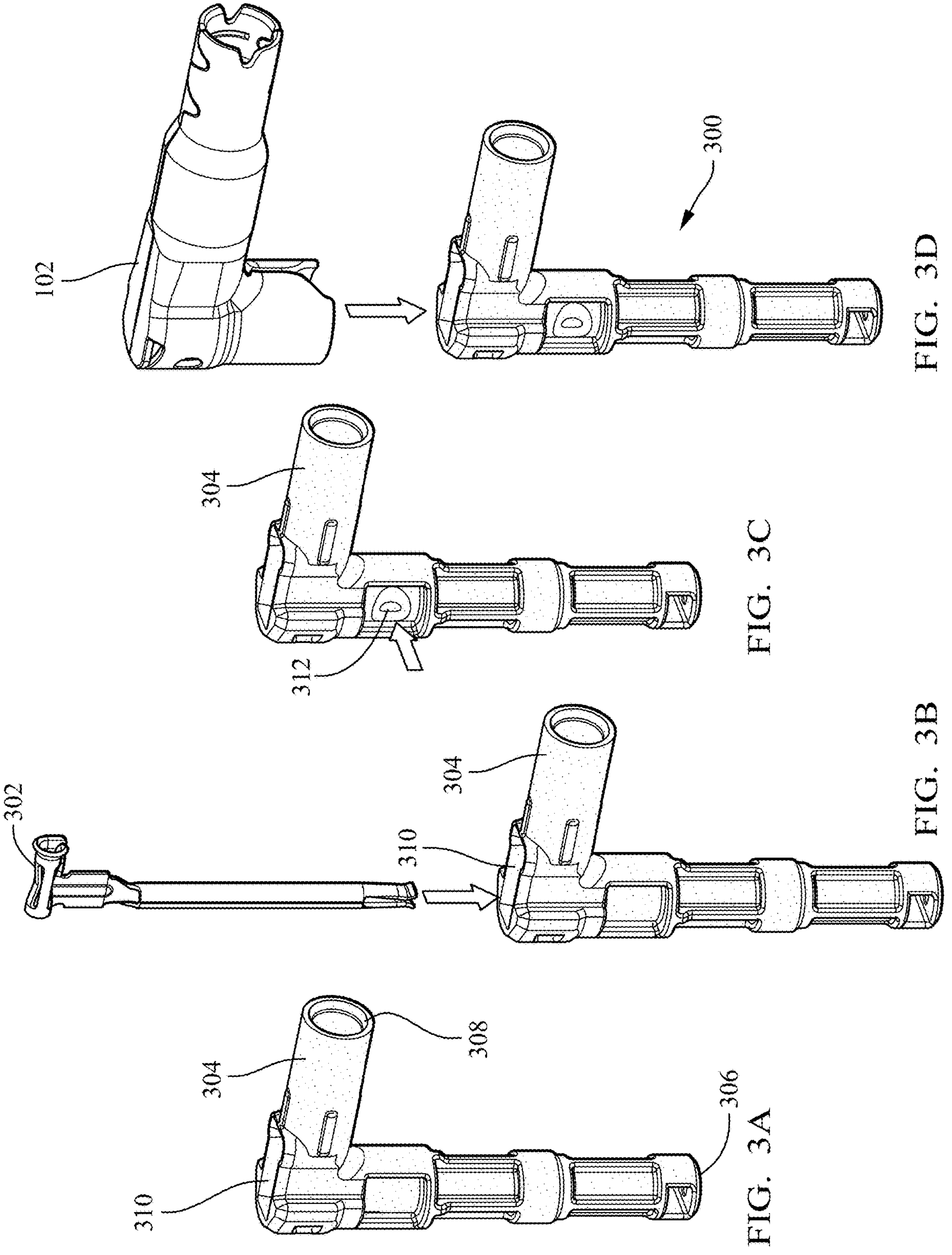
FIGS. 3A to 3D illustrate a sequence of forming a connector subassembly by inserting a central terminal within an insulator of the terminal assembly of FIG. 1 according to some embodiments.

FIGS. 3A to 3D illustrate a sequence of forming a connector subassembly 300 by inserting a central terminal 302 within an insulator 304 of the terminal assembly 100 of FIG. 1 according to some embodiments. In the illustrated example the central terminal 302 is a double ended female socket terminal, however alternative embodiments may be envisioned that employ different types of central terminals. The insulator 304 is contained within the attachment and connection portions 102, 108. FIG. 3A illustrates the L-shaped insulative housing 304 which has first and second ends 306, 308 and an opening 309 configured to receive the central terminal 302 into an L-shaped cavity 410 (see FIG. 4B) within the insulator 304. As shown in FIG. 3B, the central terminal 302, which is configured to terminate a central conductor 706 (see FIG. 7) of the coaxial cable 104, is inserted within the opening 309 in the insulative housing 304. The central terminal 302 may be secured within the housing 304 by an indentation 312 using a cold-forming process described in U.S. Pat. No. 10,680,358 B2 as shown in FIG. 3C. FIG. 3D shows the attachment portion 102 being placed over part of the connector subassembly 300. The attachment portion illustrated here is configured to open and clamp around the connector subassembly 300. Alternative embodiments may be envisioned in which the attachment portion slides over the connector subassembly 300.

Figure 4A:
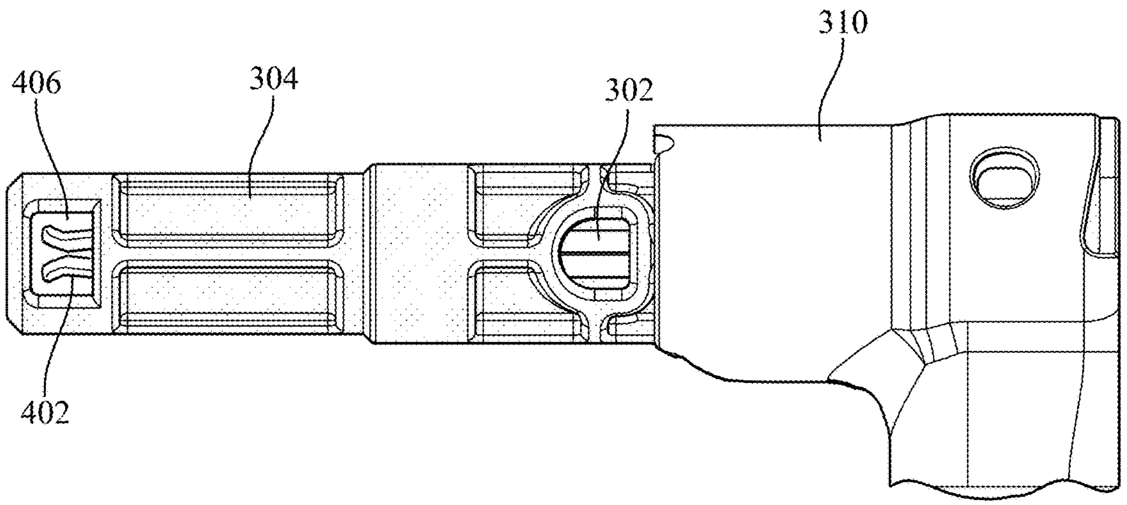
FIG. 4A is a side view of the insulator of the terminal assembly of FIG. 1 showing the central terminal in the proper location according to some embodiments.
Figure 4B:
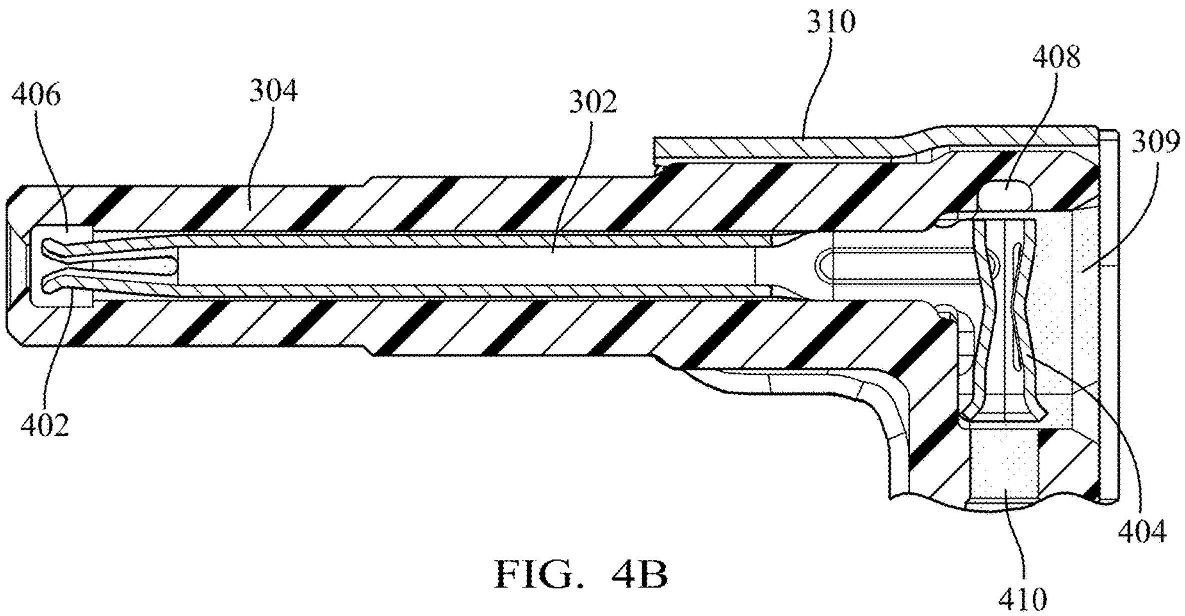
FIG. 4B is a cross section view of the insulator of the terminal assembly of FIG. 1 showing the central terminal in the proper location according to some embodiments.
Figure 5A:
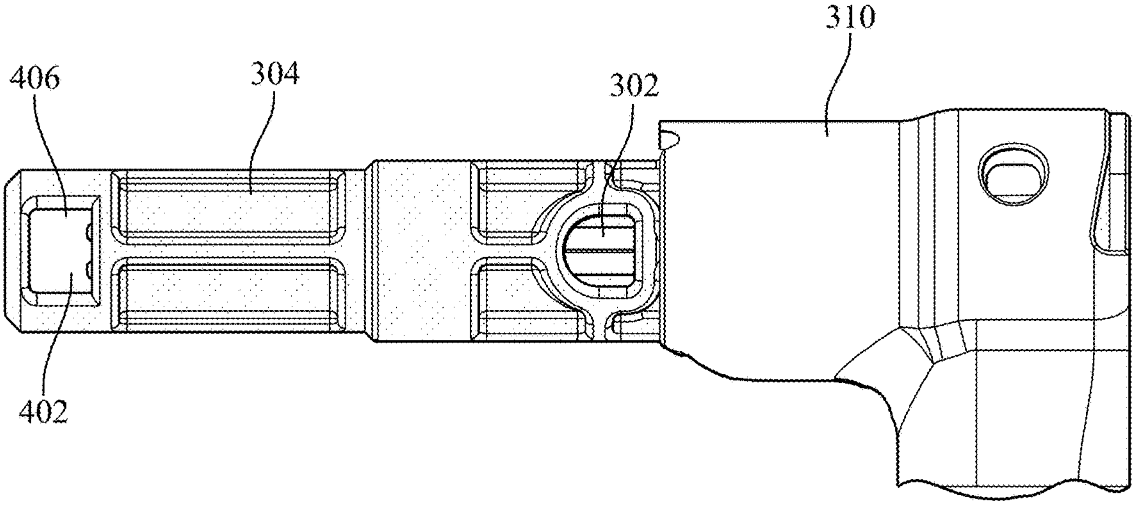
FIG. 5A is a side view of the insulator of the terminal assembly of FIG. 1 showing the central terminal in an improper location according to some embodiments.
Figure 5B:
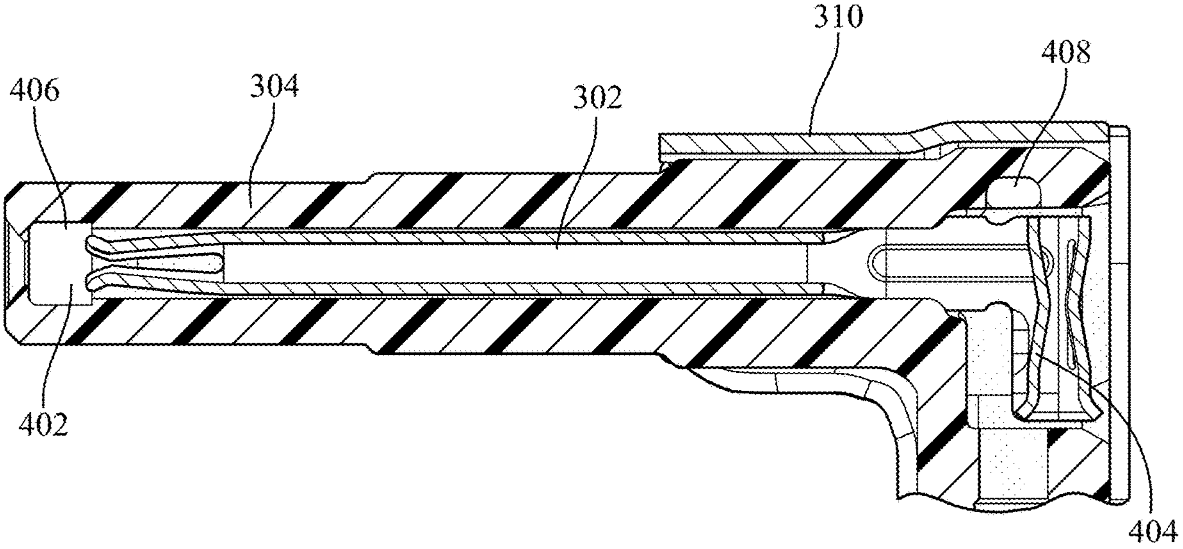
FIG. 5B is a cross section view of the insulator of the terminal assembly of FIG. 1 showing the central terminal in the improper location according to some embodiments.

FIGS. 4A and 4B show the central terminal 302 properly placed in the L-shaped terminal cavity 410. The central terminal 302 has a second connection portion 402 configured to connect to a central terminal attached to the central conductor of the coaxial cable and a first connection portion 404 that is configured to connect with a mating terminal of a corresponding coaxial connector (not shown). When the central terminal 302 is fully inserted in the L-shaped terminal cavity 410, the second connection portion 402 is visible within a terminal viewing opening 406 extending through the insulative housing 304 from an outer surface on one side of the insulative housing 304 to the outer surface on another side of the insulative housing 304. The terminal viewing opening 406 allows visual inspection and verification of the proper location of the second connection portion 402 within the insulative housing 304 by a human inspector or machine vision inspection system. By extending the terminal viewing opening 406 through the insulative housing 304, the terminal viewing opening 406 may be backlighted to provide a better view of the second connection portion 402 during the inspection process. The insulative housing 304 also defines a connection verification opening 408 which will be discussed later. FIGS. 5A and 5B show the central terminal 302 only partially inserted, and therefore improperly placed, in the L-shaped terminal cavity 410.

Figure 6:
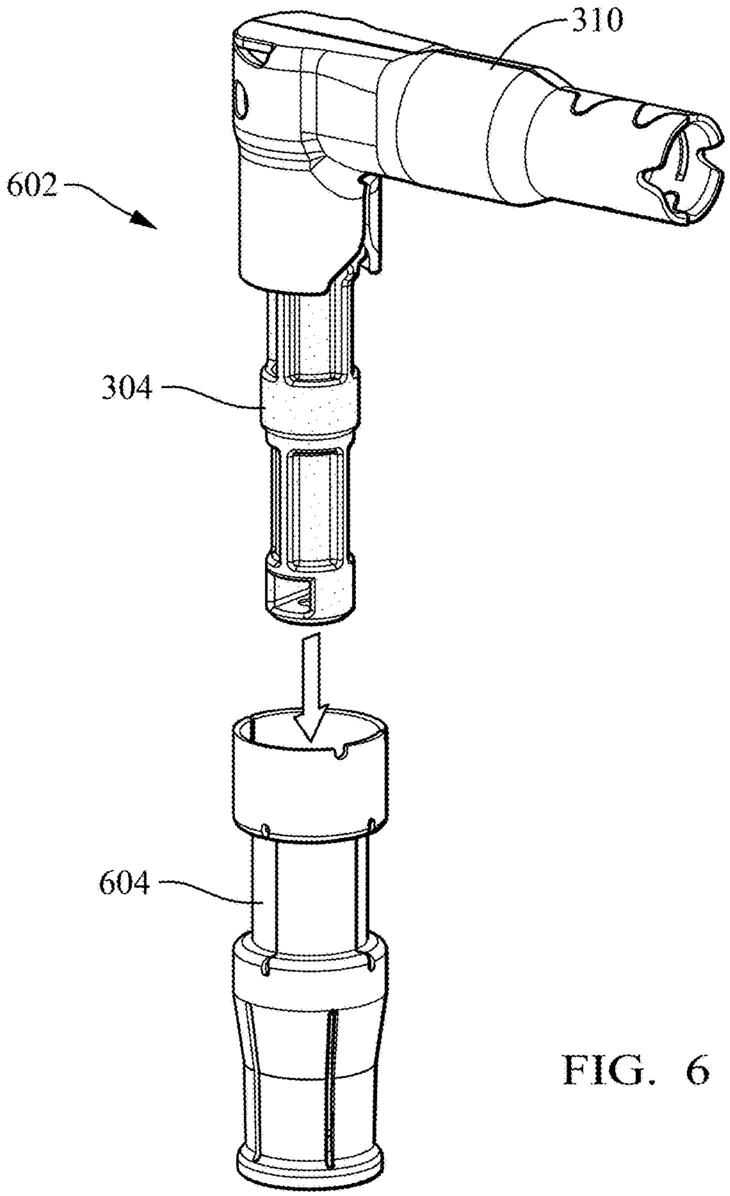
FIG. 6 illustrates an assembly step of inserting the connector subassembly of FIG. 3D within a shield terminal portion of the terminal assembly of FIG. 1 according to some embodiments.

As shown in FIG. 6, the terminal assembly subassembly 602 shown in FIG. 3D, after inspection of the central terminal 302 through the terminal viewing opening 406, is placed within a connection portion outer shield 604, thereby covering the terminal viewing opening 406.

Figure 7:
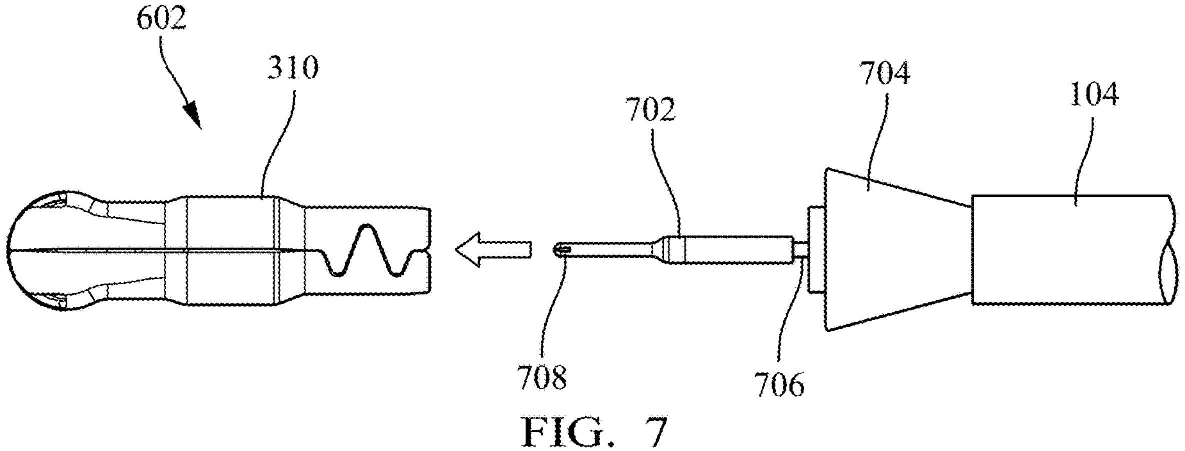
FIGS. 7, 8A, and 8B illustrate an assembly sequence of inserting a male plug terminal into the central terminal in the insulator of the terminal assembly of FIG. 1 according to some embodiments.
Figure 8A:
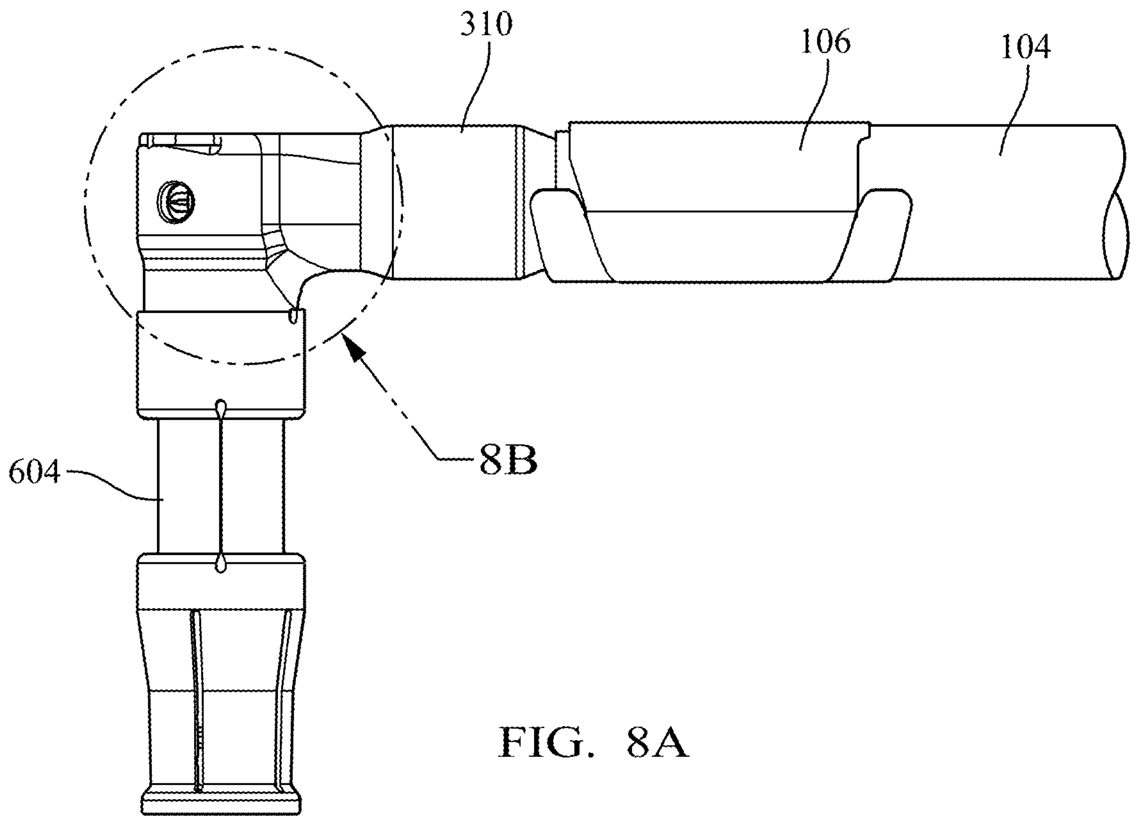
Figure 8B:
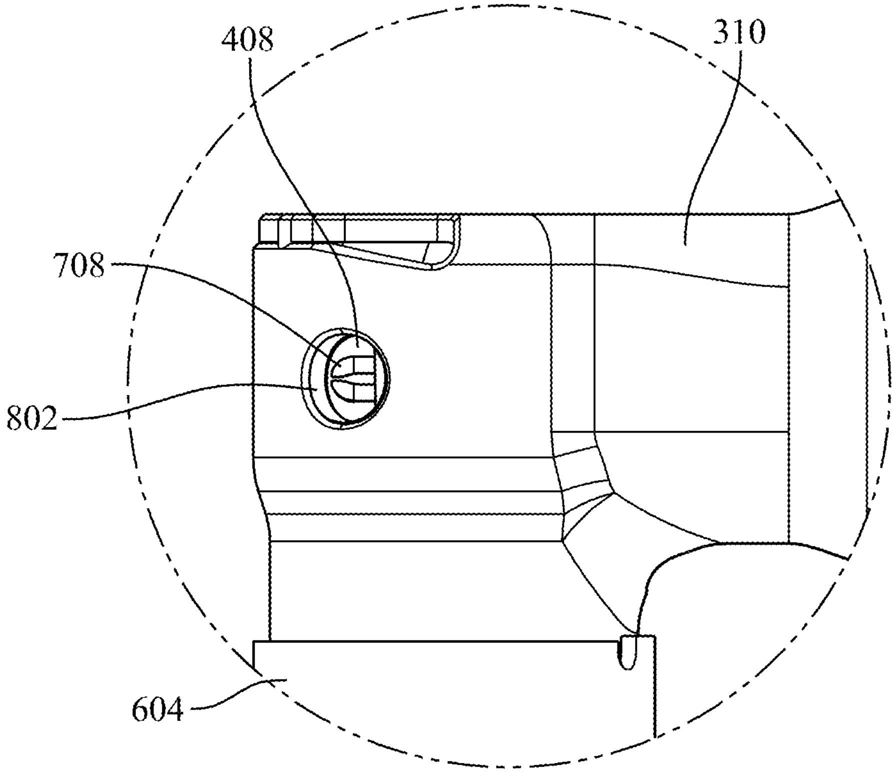
Figure 9A:
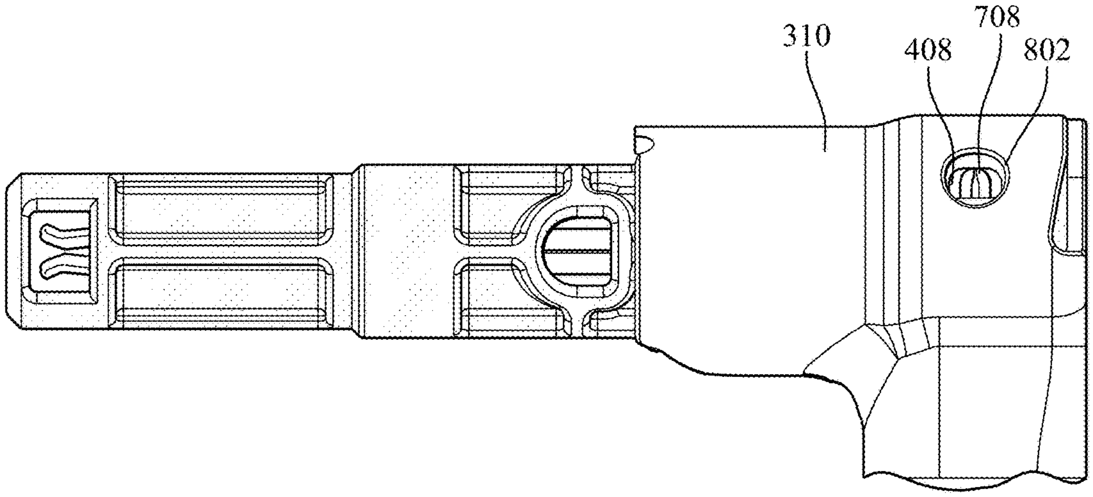
FIG. 9A is a side view of the terminal assembly of FIG. 1 showing male plug terminal in the proper location according to some embodiments.
Figure 9B:
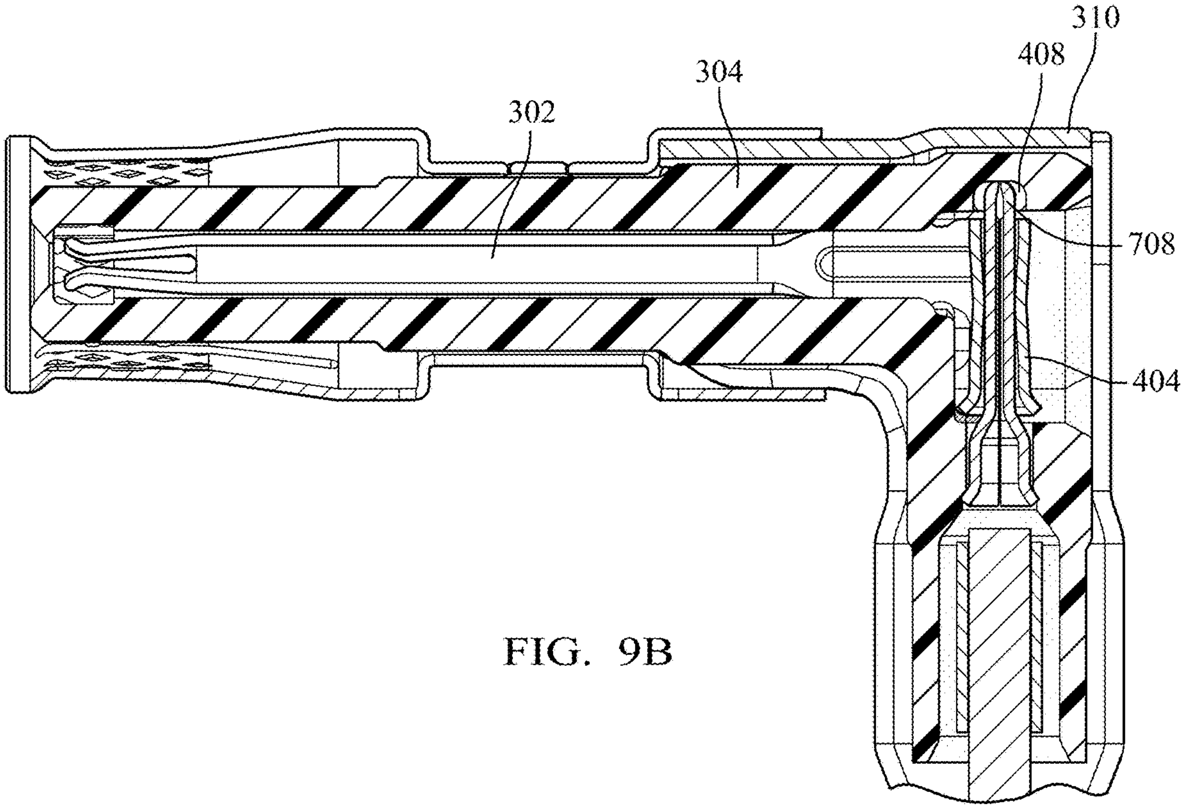
FIG. 9B is a cross section view of the terminal assembly of FIG. 1 showing the male plug terminal in the proper location according to some embodiments.
Figure 10B:
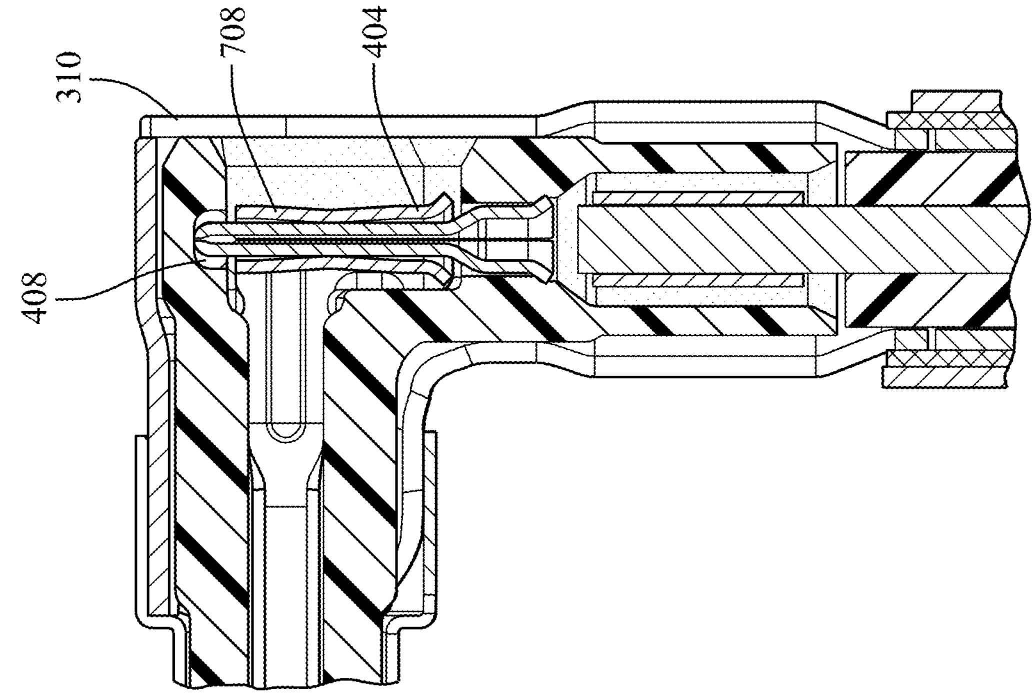
FIG. 10B is a cross section view of the terminal assembly of FIG. 1 showing the central terminal and the male plug terminal in the proper location according to some embodiments.
Figure 10A:
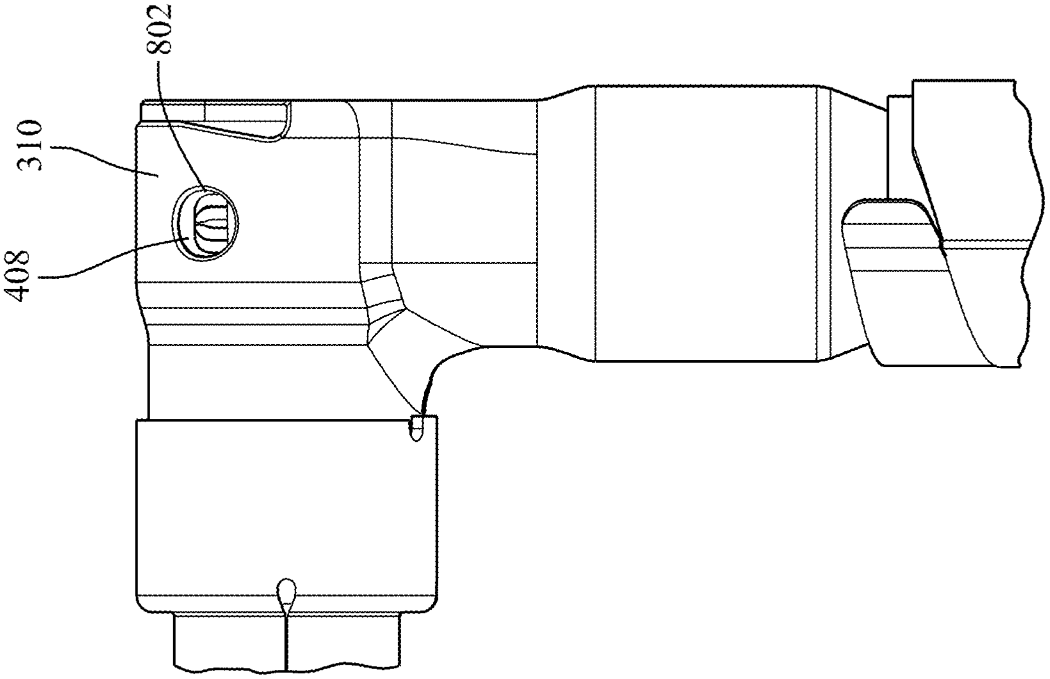
FIG. 10A is a side view of the terminal assembly of FIG. 1 showing the central terminal and the male plug terminal in the proper location according to some embodiments.

As shown in FIG. 7, the center conductor terminal 702 attached to the coaxial cable is inserted within the terminal assembly 100. The center conductor terminal 702 is a male pin terminal that is received within the first connection portion 404 of the central terminal 302 as shown in FIG. 8A. The outer shield 704 of the coaxial cable 104 is attached to a connection portion outer shield 604. As highlighted in FIG. 8B, the insulative housing 304 defines a connection verification opening 408 and the attachment portion outer shield 310 defines first and second shield openings 802 aligned with the connection verification opening 408 that allow a human inspector or machine vision inspection system to verify the proper connection between a pin tip 708 of the center conductor terminal 702 attached to the central conductor 706 of the coaxial cable 104 and the central terminal 302. FIGS. 9A and 9B show the center conductor terminal 702 properly seated within the first connection portion 404 of the central terminal 302. As shown in FIG. 9A, the center conductor terminal 702 is properly seated within the first connection portion 404 of the central terminal 302 when the pin tip 708 of the center conductor terminal 702 is visible within the connection verification opening 408. FIGS. 10A and 10B show the center conductor terminal 702 improperly seated within the first connection portion 404 of the central terminal 302. The size and location of the connection verification opening 408 in relation to the first connection portion 404 of the central terminal 302 allows for verification of appropriate pin tip placement of the center conductor terminal 702. If any portion of the pin tip 708 of the center conductor terminal 702 is visible in the connection verification opening 408 and the first and second shield openings 802 above the insulative housing 304, then a minimum acceptable connection interface between the center conductor terminal 702 and the central terminal 302 has been established. As shown in FIG. 10A, the pin tip 708 of the center conductor terminal 702 is not visible within the connection verification opening 408 when the center conductor terminal 702 is improperly seated within the first connection portion 404 of the central terminal 302.

Having the connection verification opening 408 define a through-hole allows backlighting of the connection verification opening 408 when inspecting for the pin tip 708 engagement of the center conductor terminal 702 in the first connection portion 404 of the central terminal 302 which simplifies the inspection process.

The connection verification opening 408 may be formed by stamping into the attachment portion outer shield 310 and molding the insulative housing 304 without the need for an additional manufacturing process to close the connection verification opening after inspection, e.g., no additional flap or secondary cover is needed.

While the double ended central terminal 302 described within has a female socket on each end, other embodiments of the double ended terminal be envisioned that have male pins or blades on each end or a combination for male and female features on each end of the double ended terminal.

Figure 11A:
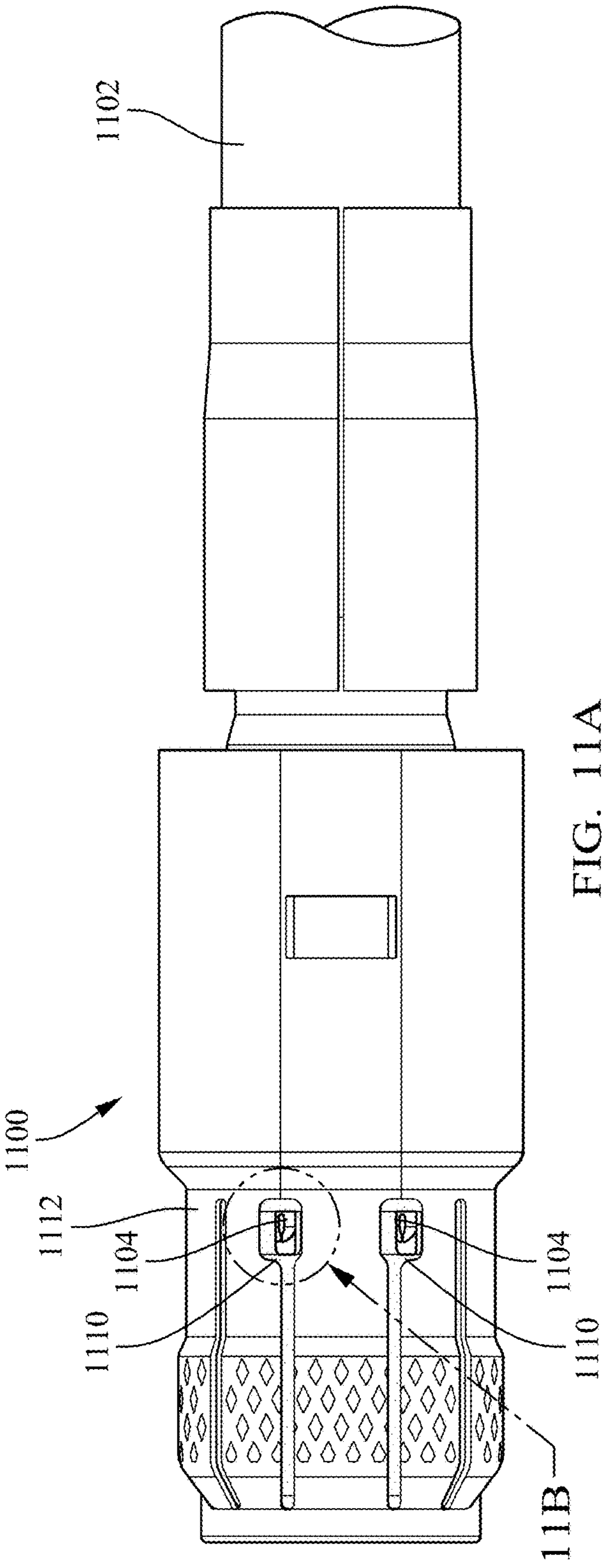
FIG. 11A illustrates a top view of another terminal assembly according to some embodiments having two female terminals and two male plug terminals.

FIG. 11A illustrates another non-limiting example of an embodiment of a terminal assembly 1100. In this example, the embodiment is a straight two pin connector for a shielded two conductor electrical cable 1102 having a parallel wire pair or a twisted wire pair.

Figure 11C:
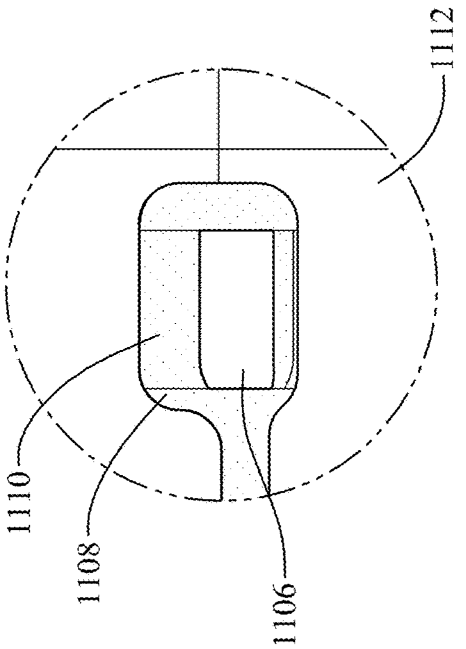
FIG. 11C is an isolated top view of the terminal assembly of FIG. 11A showing one of the male plug terminals properly mated with one of the female terminals according to some embodiments.
Figure 11B:
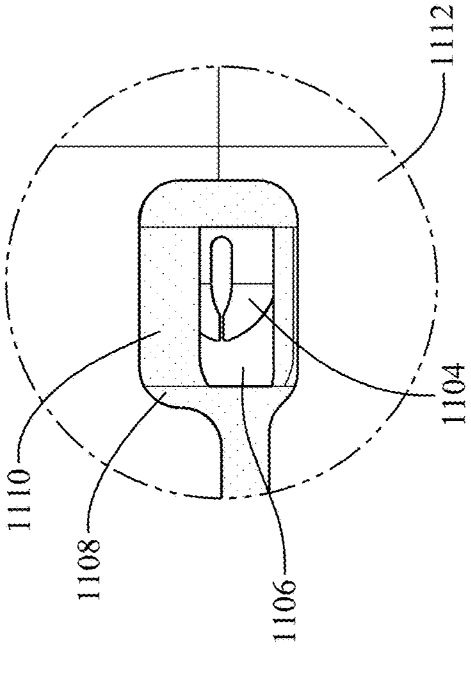
FIG. 11B is an isolated top view of the terminal assembly of FIG. 11A showing one of the male plug terminals properly mated with one of the female terminals according to some embodiments.
Figure 12:
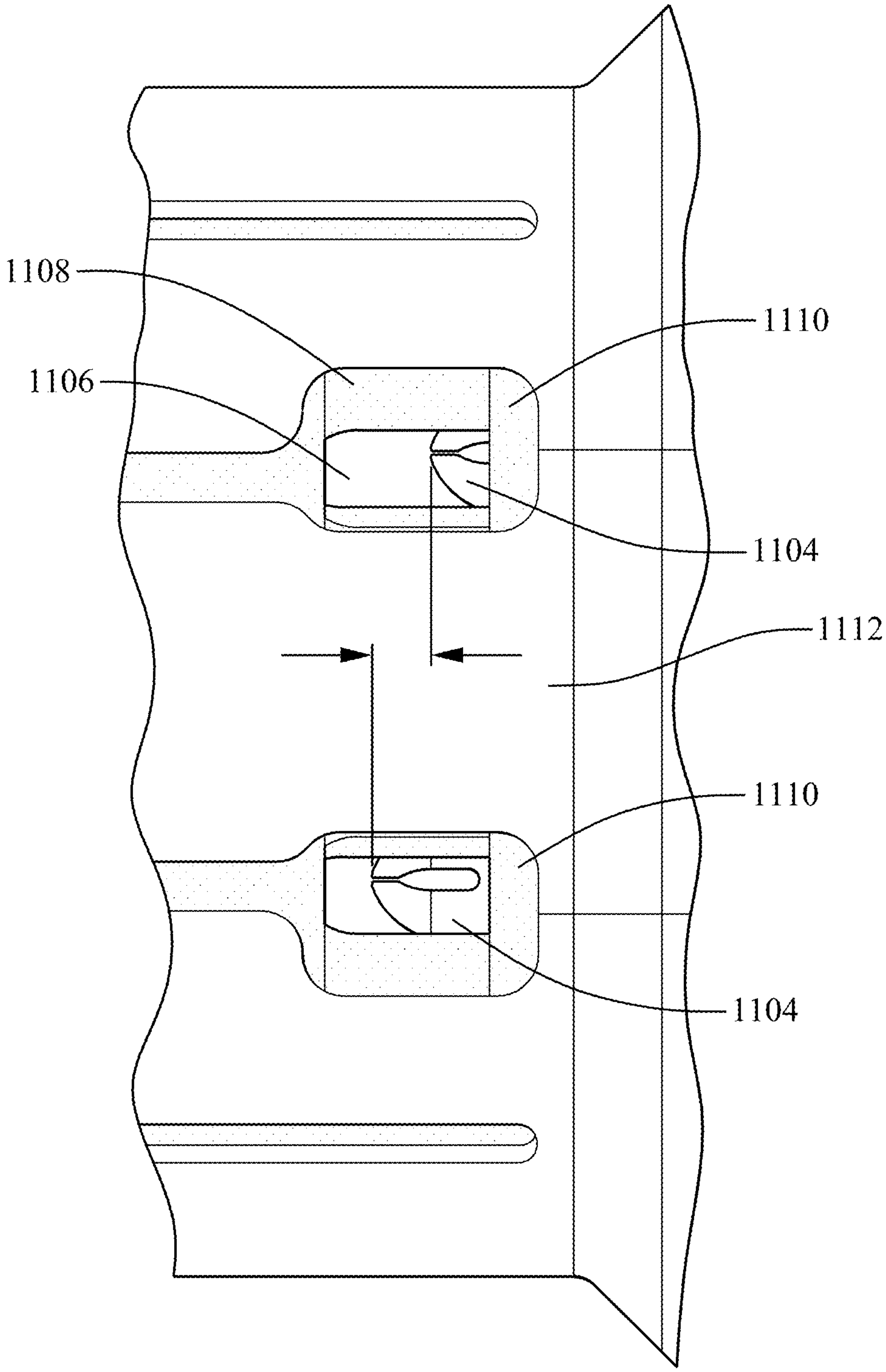
FIG. 12 is a top view of the terminal assembly of FIG. 11A showing an acceptable offset between the two male terminals when mated with the two female terminals according to some embodiments.

As shown in FIG. 11B, pin terminals 1104 attached to the conductor of the shielded two conductor electrical cable 1102 are properly seated within the female sockets 1106 of the connector terminals 1108 when the pin terminals 1104 are visible within the connection verification openings 1110 in the terminal shield 1112. The size and location of the connection verification openings 1110 in relation to the female sockets 1106 of the connector terminals 1108 allows for verification of appropriate pin tip placement of the pin terminals 1104. If any portion of the pin terminal 1104 is visible in the connection verification openings 1110, then a minimum acceptable connection interface between the pin terminals 1104 and the connector terminals 1108 has been established. As shown in FIG. 11C, the pin terminals 1104 are not visible within the connection verification openings 1110 when the pin terminals 1104 are improperly seated within the female sockets 1106 of the connector terminals 1108. As shown in FIG. 12, the connection verification openings 1110 also allow inspection and/or measurement of the pin terminals 1104 being consistently inserted within the female sockets 1106 of the connector terminals 1108.

While the terminal assembly 1100 described within has connector terminals 1108 with female sockets 1106, other embodiments of the connector terminals be envisioned that have male pins or blades.

While a right-angled coaxial connector assembly and a straight two pin connector assembly for a shielded two conductor electrical cable has been described herein, other embodiments may be different connector configurations, for example connectors having different angles between the cable and the connector or that may be used with other cable types, e.g., twin-axial or unshielded conductor cables, may also be envisioned.

In some aspects, the techniques described herein relate to a terminal assembly, including: an insulative body having a terminal cavity formed within; a first terminal disposed within the terminal cavity; and a second terminal having an interface configured to connect with the first terminal within the terminal cavity, wherein the insulative body defines a connection verification opening extending from an outer surface of the insulative body to the terminal cavity and wherein the connection verification opening is sized, shaped, and arranged to provide visual access to verify a connection between the first and second terminals.

In some aspects, the techniques described herein relate to a terminal assembly, wherein the connection verification opening extends through the terminal cavity to the outer surface on an opposite side of the insulative body in a direction generally perpendicular to a longitudinal axis of the terminal cavity.

In some aspects, the techniques described herein relate to a terminal assembly, wherein the first terminal has a first connection portion configured to connect to the second terminal and a second connection portion configured to connect with a third corresponding mating terminal and wherein a tip of the second terminal is received in the first connection portion and is visible though the connection verification opening.

In some aspects, the techniques described herein relate to a terminal assembly, wherein the insulative body also defines a terminal viewing opening distinct from the connection verification opening extending from an outer surface of the insulative body to the terminal cavity, wherein the terminal viewing opening is sized, shaped, and arranged to provide visual access to the second connection portion.

In some aspects, the techniques described herein relate to a terminal assembly, wherein the terminal viewing opening is covered by a conductive shield when the terminal assembly is fully assembled.

In some aspects, the techniques described herein relate to a terminal assembly, wherein the insulative body is disposed within a conductive shield defining a first shield opening through the conductive shield that is aligned with the connection verification opening and sized, shaped, and arranged to provide visual access to verify the connection between the first and second terminals.

In some aspects, the techniques described herein relate to a terminal assembly, wherein the conductive shield defines a second shield opening through the conductive shield located opposite the first shield opening and wherein the second shield opening is aligned with the connection verification opening and the first shield opening and is sized, shaped, and arranged to provide visual access to verify the connection between the first and second terminals.

In some aspects, the techniques described herein relate to a terminal assembly, wherein the first and second connection portions each include a female socket.

In some aspects, the techniques described herein relate to a terminal assembly, wherein a first mating axis of the first connection portion is generally perpendicular to a second mating axis of the second connection portion.

In some aspects, the techniques described herein relate to a terminal assembly, wherein a first mating axis of the first connection portion is generally parallel to a second mating axis of the second connection portion.

In some aspects, the techniques described herein relate to a terminal assembly, wherein the terminal assembly is configured to terminate a coaxial cable.

In some aspects, the techniques described herein relate to a terminal assembly, wherein the terminal assembly is configured to terminate a shielded twisted pair cable.

In some aspects, the techniques described herein relate to a method of assembling a terminal assembly, including: forming a terminal cavity within an insulative body; inserting and securing a first terminal within the terminal cavity; mating a second terminal with the first terminal within the terminal cavity, wherein the insulative body defines a connection verification opening extending from an outer surface of the insulative body to the terminal cavity and wherein the connection verification opening is sized, shaped, and arranged to provide visual access to verify a connection between the first and second terminals; and inspecting the terminal assembly through the connection verification opening to verify that the first and second terminals are properly mated by viewing a tip of the second terminal in the connection verification opening.

In some aspects, the techniques described herein relate to a method, wherein the first terminal has a first connection portion configured to mate with the second terminal and a second connection portion configured to connect with a third corresponding mating terminal, wherein the insulative body defines a terminal viewing opening distinct from the connection verification opening extending from an outer surface of the insulative body to the terminal cavity and sized, shaped, and arranged to provide visual access to the second connection portion, and wherein the method further includes: inspecting the terminal assembly to verify that the second connection portion is visible in the terminal viewing opening prior to mating the second terminal with the first terminal; and covering the terminal viewing opening with a conductive shield.

In some aspects, the techniques described herein relate to a method, wherein a first mating axis of the first connection portion is generally perpendicular to a second mating axis of the second connection portion.

In some aspects, the techniques described herein relate to a method, wherein a first mating axis of the first connection portion is generally parallel to a second mating axis of the second connection portion.

In some aspects, the techniques described herein relate to a method, wherein the method further includes: inserting the insulative body within a conductive shield defining a first shield opening through the conductive shield that is aligned with the connection verification opening and sized, shaped, and arranged to provide visual access to a tip of the second terminal to verify the connection between the first and second terminals and also defining a second shield opening through the conductive shield located opposite the first shield opening, wherein the second shield opening is aligned with the connection verification opening and the first shield opening and is sized, shaped, and arranged to provide visual access to the tip of the second terminal to verify the connection between the first and second terminals.

In some aspects, the techniques described herein relate to a method of assembling a terminal assembly, including: forming a terminal cavity within an insulative body via an injection molding process using a core that is stabilized by at least two guide pins, wherein the at least two guide pins form a terminal viewing opening extending from an outer surface of the insulative body to the terminal cavity; inserting and securing a first terminal within the terminal cavity, wherein the first terminal has a first connection portion configured to connect with a second terminal and a second connection portion configured to connect with a third terminal; and inspecting the terminal assembly to verify that the second connection portion is visible through the terminal viewing opening.

In some aspects, the techniques described herein relate to a method, wherein the at least two guide pins form the terminal viewing opening such that the opening extends through the terminal cavity to the outer surface on opposite sides of the insulative body.

In some aspects, the techniques described herein relate to a method, wherein the core is stabilized by four or more guide pins that form four or more openings extending through the terminal cavity to the outer surface on opposite sides of the insulative body.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A terminal assembly, comprising:

an insulative body having a terminal cavity formed within;

a first terminal disposed within the terminal cavity; and a second terminal having an interface configured to connect with the first terminal within the terminal cavity, wherein the insulative body defines a connection verification opening extending from an outer surface of the insulative body to the terminal cavity and wherein the connection verification opening is sized, shaped, and arranged to provide visual access to verify a connection between the first and second terminals, the connection verification opening extending through the terminal cavity to the outer surface on an opposite side of the insulative body in a direction generally perpendicular to a longitudinal axis of the terminal cavity.

2. The terminal assembly according to claim 1, wherein the first terminal has a first connection portion configured to connect to the second terminal and a second connection portion and wherein a tip of the second terminal is received in the first connection portion and is visible though the connection verification opening.

3. The terminal assembly according to claim 2, wherein the insulative body also defines a terminal viewing opening distinct from the connection verification opening extending from an outer surface of the insulative body to the terminal cavity, wherein the terminal viewing opening is sized, shaped, and arranged to provide visual access to the second connection portion.

4. The terminal assembly according to claim 3, wherein the terminal viewing opening is covered by an attachment portion outer shield when the terminal assembly is fully assembled.

5. The terminal assembly according to claim 2, wherein the insulative body is disposed within an attachment portion outer shield defining a first shield opening through the attachment portion outer shield that is aligned with the connection verification opening and sized, shaped, and arranged to provide visual access to verify the connection between the first and second terminals.

6. The terminal assembly according to claim 5, wherein the attachment portion outer shield defines a second shield opening through the attachment portion outer shield located opposite the first shield opening and wherein the second shield opening is aligned with the connection verification opening and the first shield opening and is sized, shaped, and arranged to provide visual access to verify the connection between the first and second terminals.

7. The terminal assembly according to claim 6, wherein the first and second connection portions each comprise a female socket.

8. The terminal assembly according to claim 6, wherein a first mating axis of the first connection portion is generally perpendicular to a second mating axis of the second connection portion.

9. The terminal assembly according to claim 6, wherein a first mating axis of the first connection portion is generally parallel to a second mating axis of the second connection portion.

10. The terminal assembly according to claim 1, wherein the terminal assembly is configured to terminate a coaxial cable.

11. The terminal assembly according to claim 1, wherein the terminal assembly is configured to terminate a shielded twisted pair cable.

12. A method of assembling a terminal assembly, comprising:

forming a terminal cavity within an insulative body;

inserting and securing a first terminal within the terminal cavity;

mating a second terminal with the first terminal within the terminal cavity, wherein the insulative body defines a connection verification opening extending from an outer surface of the insulative body to the terminal cavity and wherein the connection verification opening is sized, shaped, and arranged to provide visual access to verify a connection between the first and second terminals; and inspecting the terminal assembly through the connection verification opening to verify that the first and second terminals are properly mated by viewing a tip of the second terminal in the connection verification opening.

13. The method according to claim 12, wherein the first terminal has a first connection portion configured to mate with the second terminal and a second connection portion configured to connect with a third corresponding mating terminal, wherein the insulative body defines a terminal viewing opening distinct from the connection verification opening extending from an outer surface of the insulative body to the terminal cavity and sized, shaped, and arranged to provide visual access to the second connection portion, and wherein the method further comprises:

inspecting the terminal assembly to verify that the second connection portion is visible in the terminal viewing opening prior to mating the second terminal with the first terminal; and covering the terminal viewing opening with an attachment portion outer shield.

14. The method according to claim 13, wherein a first mating axis of the first connection portion is generally perpendicular to a second mating axis of the second connection portion.

15. The method according to claim 13, wherein a first mating axis of the first connection portion is generally parallel to a second mating axis of the second connection portion.

16. The method according to claim 13, wherein the method further comprises:

inserting the insulative body within the attachment portion outer shield which defines a first shield opening through the attachment portion outer shield that is aligned with the connection verification opening and sized, shaped, and arranged to provide visual access to a tip of the second terminal to verify the connection between the first and second terminals and also defining a second shield opening through the attachment portion outer shield located opposite the first shield opening, wherein the second shield opening is aligned with the connection verification opening and the first shield opening and is sized, shaped, and arranged to provide visual access to the tip of the second terminal to verify the connection between the first and second terminals.

* * * * *